United States Patent [19]
Harrowing

[11] 3,793,104
[45] Feb. 19, 1974

[54] PROCESS FOR RESTORING AND COVERING SUCTION COUCH SHELLS

[75] Inventor: Stewart Harrowing, East Farnham, Quebec, Canada

[73] Assignee: Lawron Industries Limited, East Farnham, Quebec, Canada

[22] Filed: Mar. 31, 1972

[21] Appl. No.: 240,218

[52] U.S. Cl............ 156/94, 156/191, 156/242, 156/253, 162/276, 264/36
[51] Int. Cl............................. B32b 35/00
[58] Field of Search... 156/184, 165, 187, 188, 450, 156/94, 191, 242, 253; 162/272, 274, 276; 264/36

[56] References Cited
UNITED STATES PATENTS

| | | | |
|---|---|---|---|
| 1,988,640 | 1/1935 | Welsford | 156/192 X |
| 3,063,888 | 11/1962 | Howard et al. | 156/187 |
| 3,519,520 | 7/1970 | Newman, Jr. | 156/184 X |
| 2,115,543 | 4/1938 | Thackray | 156/184 X |
| 2,009,848 | 7/1935 | Keltie | 156/192 X |
| 2,977,269 | 3/1961 | Nerwick | 156/184 X |

Primary Examiner—Douglas J. Drummond
Assistant Examiner—M. G. Wityshyn

[57] ABSTRACT

A process for restoring and covering suction couch shells, which shells consist of a metal cylinder perforated by multiple drainage holes, when the drainage holes have become badly affected by outer surface cavitation due to abrasive particles in the water. The process comprises the steps of: cleaning and roughening the metal surface of the holes as well as the outer surface of the cylinder; winding around the outer surface of the cylinder plural layers of a polyethylene tape; winding a re-inforcing layer of a transparent cellulose tape over the polyethylene tape; pouring a thermosetting resin into the drainage holes from the inside of the cylinder and allowing the resin to set; removing the polyethylene and the re-inforcing transparent cellulose tapes; winding under tension on the outer surface of the cylinder successive layers of a woven glass or synthetic fibre tape impregnated with a thermosetting resin; heat treating the cylinder; and redrilling the holes.

11 Claims, 10 Drawing Figures

PATENTED FEB 19 1974 3,793,104
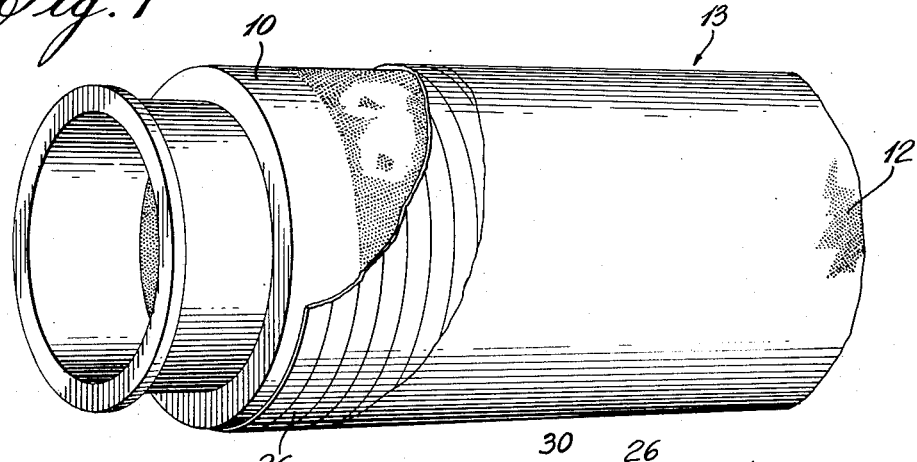
Fig. 1
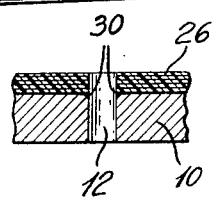
Fig. 2
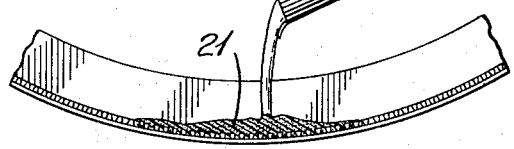
Fig. 3
Fig. 10
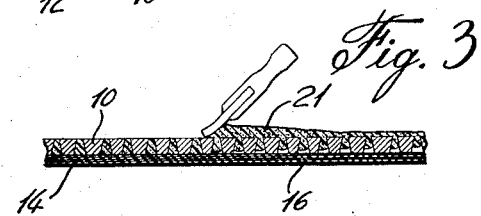
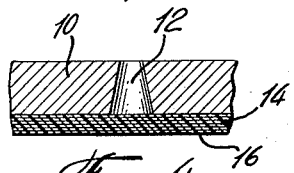
Fig. 4
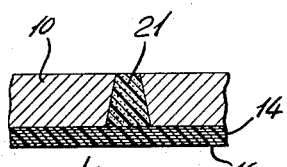
Fig. 5
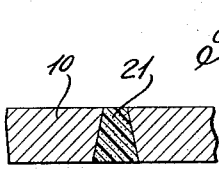
Fig. 6
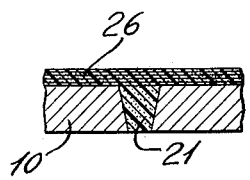
Fig. 7
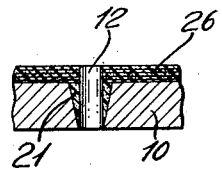
Fig. 9
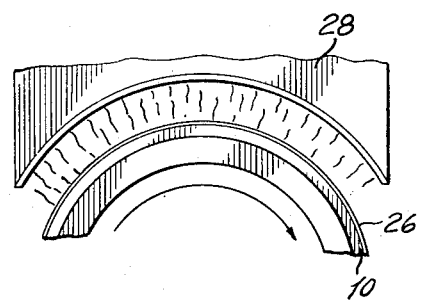
Fig. 8

PROCESS FOR RESTORING AND COVERING SUCTION COUCH SHELLS

This invention relates to a process for restoring and covering suction shells and more particularly suction couch shells.

As commonly known, the suction couch shells are used for the removal of water in the formation of a paper sheet. A suction couch shell consists of a metal cylinder which is perforated by multiple drainage holes extending from the inside to the outside of the metal cylinder. By means of applied vacuum from the inside of the cylinder, water is drawn out of the paper or cellulose fibres passing over the outer surface of the shell. The passage of water and other fine abrasive particles causes cavitation and wear to the upper and outer surface of the holes. This occurs over an extended period of time and the hole gradually assumes an elliptical configuration in the circumferential direction as well as a fluted effect extending into the inner shell. As this condition grows, the ability of the shell to drain water becomes less and less efficient until the shell must be removed from service. This can result in expensive replacement cost.

It is known to apply a rubber cover to a damaged suction couch shell and to redrill the drainage holes through the rubber cover so as to restore the drainage holes to their original diameter. However, this has the disadvantage to leave an overhang within the drainage holes under the cover. In actual operation, this overhang causes stock "hang up" in the drainage holes which results in the formation of corrosion pockets.

It is thus the object of the present invention to completely fill the drainage holes in the areas where, due to previous overhangs, corrosion pockets would have formed and contributed to stress lines and possible premature failure of the shell. In other words, it is the object of the present invention to restore a solid cross section in the hole location permitting re-drilling of holes of uniform diameter throughout the shell thickness.

It is also the object of the invention to protect the upper surface of the shell from the formation or reformation of the elliptical holes by means of a protective and replaceable upper cover or layer and also to control the formation of corrosion pockets under the replaceable surface.

The process in accordance to the invention comprises the steps of: cleaning and roughening the metal surface of the holes as well as the outer surface of the cylinder; winding around the outer surface of the cylinder plural layers of a polyethylene tape from 2 to 6 inches wide and from 0.002 to 0.025 inch thick, each turn of tape overlapping the preceeding turn by 25 to 90 percent so as to provide a good seal; winding a reinforcing layer of a transparent cellulose tape from 2 to 36 inches wide over the polyethylene tape; pouring a preparation of liquid thermosetting resin into the holes from the inside of the cylinder and allowing the resin to set over a period of time exceeding 1 hour; removing the polyethylene and the re-inforcing transparent cellulose tapes; winding under tension on the outer surface of the cylinder successive layers of a woven glass or synthetic fibre tape from 2 to 6 inches wide impregnated with a concentration of 35 to 55 percent thermosetting resin until the required thickness is reached, each layer of tape overlapping the preceeding layer by 25 to 90 percent at an angle of wrap of 5 to 15 degrees; heat treating the cylinder at a temperature ranging from 212° to 300° F for 2 to 8 hours; and redrilling the holes to restore their normal configuration.

Before pouring the thermosetting resin, the inside of the cylinder is divided into equal longitudinal segments and the thermosetting resin is poured into the holes in each bottom segment. The width of each segment depends on the radius of the cylinder and may vary from 6 to 18 inches. When the thermosetting resin in the segment has hardened, the cylinder is rotated until the next segment is in the bottom position and the procedure repeated until all the holes in all the segments are filled and the resin set.

When the holes in the shell are only slightly affected by outer surface cavitation, the holes are allowed to remain open, and are not externally wrapped with tape and filled with resin. A tape of woven glass or synthetic fabric of the same type as the one disclosed above is spirally wound on the outside surface of the shell while applying a predetermined tension to the tape when it is being wound. In so doing the excess resin is impressed out of the tape and allowed to flow into the minor impressions in the upper part of the holes. The resin then tapers off to nothing at the edge of the ellipse or taper in the holes so as to restore the holes to their normal configuration after redrilling thereof.

The invention will now be disclosed with reference to a preferred embodiment thereof and to the accompanying drawing in which:

FIG. 1 illustrates a perspective view of a suction couch shell restored in accordance with the process of the invention;

FIGS. 2 to 9 illustrate the most important steps in the restoration of the suction couch shells; and FIG. 10 illustrates a partial section of a shell having holes slightly affected by cavitation and restored in accordance with an alternative process of the invention.

Referring to FIG. 1, there is shown a restored suction couch shell 10 having a plurality of drainage holes 12 therein (only a few shown) pierced through the shell and its covering designated generally by reference 13.

It is assumed that the original drainage holes were badly affected and have taken an elliptical configuration in the circumferential direction as well as a fluted effect extending into the inner shell. In order to restore the original configuration of the holes, the following steps are taken:

1. The metal surface of the holes as well as the outer surface of the suction couch shell 10 are cleaned and roughened; such step may be carried out by blasting with either angular steel or aluminum oxide grit.

2. A 2 to 6 inches wide tape of 0.002 to 0.025 inch thick polyethylene tape 14 (FIGS. 2 to 5) is spirally wound around the outer surface of the shell, each layer of tape overlapping the preceding layer by 25 to 90 percent to permit a barrier or seal to form; preferably, the tape is 4 to 6 inches wide and 0.002 to 0.004 inch thick and the overlapping varies from 50 to 75 percent; plural layers of such tape are applied one of the top of the other.

3. A re-inforcing layer of transparent cellulose tape 16 from 2 to 36 inches wide is applied over the polyethylene tape 14 as illustrated more clearly in the enlarged cross section of FIG. 3.

4. As illustrated in FIG. 2, the inside of the shell is divided into equal longitudinal segments by drawing chalk lines on the inside surface of the shell and a preparation of liquid thermosetting resin 21 is poured into the holes in each longitudinal bottom segment using a bucket 22 or any other suitable means until all the holes are filled flush with the inner shell surface. Depending on the radius of the shell, a segment ranging from 6 to 12 inches in width can be filled in this manner. All the holes are filled in the longitudinal direction and the resin allowed to harden over a period of time exceeding one hour, but preferably from 2 to 3 hours. Dispersion in the holes may be accelerated and made more uniform by means of a rubber doctor blade or squeegee 24 as illustrated in FIG. 3. The shell 10 is then rotated until the next segment is in the bottom position and the procedure is repeated until all the holes are filled and the resin set.

5. After the resin has set, the polyethylene film tape and the re-inforcing transparent cellulose film tape are removed as illustrated in FIG. 6.

6. As illustration in FIG. 7, multiple layers 26 of a 2 to 6 inches wide woven glass or synthetic fibre tape are then wounded spirally on the upper surface of the shell. The tape is first past through a resin impregnating bath where a concentration of 35 to 55 percent thermosetting resin is impregnated into the tape. The tape overlap area is from 25 to 90 percent and the angle of wrap is from 5° to 15°. Preferably the concentration of thermosetting resin is from 35 to 40 percent, the tape overlap from 35 to 50 percent and the angle of wrap from 10° to 15°. Successive layers are built up until the required or specified thickness of the tape is reached. During the complete operation, the shell is kept rotating so as to permit the excess resin to flow into the minor impressions in the upper part of the holes.

7. An infra-red tunnel 28 is placed over the shell and a heat treatment ranging in temperature from 212° to 300° F and time from 2 to 8 hours is applied to the resin impregnated layers of woven glass or synthetic fibre tapes, as illustrated in FIG. 8 to harden the cover.

8. Re-drilling of the holes through the cover is then performed so as to restore the original configuration thereof as illustrated in FIG. 9.

The foregoing method is designed to provide corrosion protection and eliminate hole cavitation where holes are badly affected. In cases where holes are only very slightly affected by outer surface cavitation, the inner hole filling procedure illustrated in favour of the following procedure:

All holes are allowed to remain open, that is are not externally wrapped with tape and filled with resin. The shell is placed in a lathe and is turned at speeds varying from 20 to 80 revolutions per minute depending on shell diameter. An initial layer of a 2 to 6 inches wide woven glass or synthetic fabric tape is then spirally wound on the outside surface of the shell. The initial pass through an impregnation bath is made in such a way as to permit a resin pick-up of 50 percent. At this point the roll must continue to rotate and cannot be stopped at any point in the process. As tension is applied to the initial layer of tape, the excess resin is impressed out of the tape and allowed to flow into minor impressions in the upper part of the holes. The resin then tapers off to nothing at the edge of the ellipse or taper in the holes as illustrated at 30 in FIG. 10. Plural successive layers of woven glass or synthetic fabric tapes are wound and, with the roll continuing to turn, the cover is heat treated and hardened as disclosed above in connection with the first process.

Although the invention has been disclosed with reference to perferred embodiments thereof, it is to be understood that various modifications may be made thereto within the scope of the following claims.

I claim:

1. A process for restoring and covering suction couch shells used in the removal of water in the formation of paper sheets and consisting of a metal cylinder perforated by multiple drainage holes which extend from the inside to the outside surface of the metal cylinder and have become badly affected by outer surface cavitation due to abrasive particles in the water, said process comprising the steps of:
    a. cleaning and roughening the metal surface of the holes as well as the outer surface of the cylinder;
    b. winding around the outside surface of the cylinder plural layers of a polyethylene tape of 2 to 6 inches in width and of 0.002 to 0.025 inch in thickness, each turn of tape overlapping the preceding turn by 25 to 90 percent so as to provide a good seal;
    c. winding a re-inforcing layer of a transparent cellulose tape of 2 to 36 inches in width over the polyethylene tape;
    d. pouring a preparation of liquid thermosetting resin into the holes from the inside of the cylinder and allowing the resin to set over a period of time exceeding 1 hour;
    e. removing the polyethylene tape and the re-inforcing transparent cellulose tape;
    f. winding under tension on the outside surface of the cylinder successive layers of woven glass or synthetic fibre tapes of 2 to 6 inches in width impregnated with a concentration of 35 to 55 percent thermosetting resin, each turn overlapping the preceding turn by 25 to 90 percent at an angle of wrap of 5° to 15°;
    g. heat treating the cylinder at a temperature ranging from 212° to 300° F for 2 to 8 hours; and
    h. redrilling the holes so as to restore their normal configuration.

2. A process as defined in claim 1, wherein the cleaning and roughening step is performed by blasting using either angular steel or aluminum oxide grit.

3. A process as defined in claim 1, wherein the polyethylene tape is 4 to 6 inches in width and 0.002 to 0.004 inch in thickness.

4. A process as defined in claim 1, wherein each turn of polyethylene tape overlaps the preceding turn by 50 to 75 percent.

5. A process as defined in claim 1, wherein the reinforcing tape of transparent cellulose is approximately 4 inches wide.

6. A process as defined in claim 1, wherein the inside of the cylinder is divided into equal longitudinal segments and the thermosetting resin poured into the holes in each bottom segment, the width of each segment depending on the radius of the cylinder and varying from 6 to 18 inches.

7. A process as defined in claim 6, wherein the cylinder is rotated until the next segment is in the bottom position and the procedure repeated until all the holes in all the segments are filled and the resin set.

8. A process as defined in claim 6, wherein the dispersion of the thermosetting resin into the holes is accelerated and made uniform by means of a rubber doctor or squeegee.

9. A process as defined in claim 1, wherein the woven glass or synthetic fibre tape is 4 to 6 inches in width.

10. A process as defined in claim 1, wherein the concentration of thermosetting resin in the woven glass or synthetic fibre tape is 35 to 40 percent.

11. A process as defined in claim 1, wherein the turns of woven glass or synthetic fibre tapes are overlapped by 25 to 50 percent and the angle of wrap of such tape is from 10° to 15°.

* * * * *